(12) United States Patent
Morikawa et al.

(10) Patent No.: US 7,510,087 B2
(45) Date of Patent: Mar. 31, 2009

(54) CASE WITH PARTITION MEMBER

(75) Inventors: Hiroshi Morikawa, Shizuoka (JP); Masanori Goto, Shizuoka (JP)

(73) Assignee: Toyo Roki Seizokabushiki Kaisha, Hamamatsu-Shi (JP)

( * ) Notice: Subject to any disclaimer, the term of this patent is extended or adjusted under 35 U.S.C. 154(b) by 500 days.

(21) Appl. No.: 10/565,844

(22) PCT Filed: Aug. 6, 2004

(86) PCT No.: PCT/JP2004/011357
§ 371 (c)(1), (2), (4) Date: Jan. 25, 2006

(87) PCT Pub. No.: WO2005/014141
PCT Pub. Date: Feb. 17, 2005

(65) Prior Publication Data
US 2006/0207928 A1    Sep. 21, 2006

(30) Foreign Application Priority Data
Aug. 8, 2003   (JP) ................................. 2003-290797

(51) Int. Cl.
*B01D 35/30* (2006.01)
*B01D 35/28* (2006.01)
(52) U.S. Cl. ................ 210/445; 210/435; 210/436; 210/453; 210/454; 210/455

(58) Field of Classification Search ............... None
See application file for complete search history.

(56) References Cited

U.S. PATENT DOCUMENTS 3,803,810 A * 4/1974 Rosenberg .................. 96/6
5,536,413 A * 7/1996 Bormann et al. ............ 210/650

FOREIGN PATENT DOCUMENTS

| FR | 1162591 | 9/1958 |
|---|---|---|
| JP | 11-277628 | 10/1999 |
| JP | 2003-33613 | 2/2003 |

* cited by examiner

*Primary Examiner*—Krishnan S Menon
*Assistant Examiner*—Benjamin Kurtz
(74) *Attorney, Agent, or Firm*—Young & Thompson

(57) ABSTRACT

A case with a partitioning member in which the welding between a case and a cover and between the case and the partitioning member can be confirmed by an airtightness test. The case with a partitioning member includes a cover and a partitioning member held between the case and the cover. On the inside of a first welding portion in which the case and cover are welded to each other, a second welding portion in which the case and partitioning member are welded to each other is provided, and on the inside of the second welding portion, a third welding portion in which the case and the partitioning member are welded to each other is provided. Holes open to the atmosphere are provided in the case between second and third welding portions.

9 Claims, 6 Drawing Sheets detailed view of portion III detailed view of portion III (A)

(B)

CASE WITH PARTITION MEMBER

TECHNICAL FIELD

The present invention relates to a case with a partitioning member, in which three members of a case, a cover, and a partitioning member for partitioning the interior of the case and the cover are welded. Specifically, as the case with a partitioning member, an automatic transmission filter for filtering an automatic transmission oil for a motor vehicle, a resonator integrated surge tank that reduces noise of an intake passage of an engine, an air filter for filtering air in an intake passage of an engine, and the like can be cited.

BACKGROUND ART

A three member welded structure in which three members of a case, a cover, and a partitioning member are welded at the same time has been known (for example, refer to Patent Document 1). FIGS. 6 and 7 show an example in which the three member welded structure is applied to an automatic transmission oil filter. In the three member welded structure in which the three members are welded at the same time, a filter element 2 used as the partitioning member is fitted in a cover 1, and a case 3 is welded to the filter element 2 at the same time the case 3 is welded to the cover 1. In FIG. 7, hatched portions show a welding portion 4 between the case 3 and the cover 1 and a welding portion 5 between the case 3 and the filter element 2.

The automatic transmission oil filter is subjected to an airtightness test after welding. The airtightness test is carried out as follows: an opening 3a of the case is closed by a lid jig 6, and a negative pressure is produced at an opening 1a of the cover 1. In the state in which the negative pressure is produced, a change of pressure in the automatic transmission oil filter is detected.

Patent Document 1: Japanese Patent Laid-Open No. 11-277628

DISCLOSURE OF THE INVENTION

In the conventional three member welded structure, even if the case 3 and the filter element 2 are not welded to each other, air does not leak from the outside of automatic transmission oil filter to the inside thereof if the case 3 and the cover 1 are welded to each other. Therefore, even if the case 3 and the filter element 2 are not welded to each other, it is judged that the airtightness test result is good, and the automatic transmission oil filter is shipped on the basis of this judgement.

Accordingly, an object of the present invention is to provide a case with a partitioning member capable of confirming not only welding between a case and a cover but also welding between the case and a partitioning member.

The present invention solves the above-described problem by a case with a partitioning member including a case (11), a cover (12) for covering the case (11), and a partitioning member (13) which is held between the case (11) and the cover (12) to partition the interior of the case (11) and the cover (12), characterized in that a second welding portion (22) in which the case (11) and the partitioning member (13) are welded to each other is provided on the inside of a first welding portion (21) in which the case (11) and the cover (12) are welded to each other; a third welding portion (23) in which the case (11) and the partitioning member (13) are welded to each other is provided on the inside of the second welding portion (22); and a hole (24) open to the atmosphere is provided in the case (11) between the second welding portion (22) and the third welding portion (23).

Also, the present invention is characterized in that in the above-described case with a partitioning member, a welding allowance (19a) in the first welding portion (21) of the case (11) is higher than a welding allowance (19b) in the second welding portion (22) of the case (11).

Also, the present invention is characterized in that in the above-described case with a partitioning member, the case with a partitioning member is an automatic transmission oil filter, and the partitioning member is a filter element (13).

Further, the present invention is characterized in that in the above-described case with a partitioning member, the interior of the automatic transmission oil filter is divided into a dust side (33) on the upstream side of oil flow and a clean side (34) on the downstream side thereof by the filter element (13), and the second welding portion (22) and the third welding portion (23) are provided on the side of the dust side (33) of the filter element.

EFFECT OF THE INVENTION

According to the present invention, if the welding between the case and the partitioning member is insufficient, air leaks into the case with a partitioning member through the hole open to the atmosphere, passing through the third welding portion of the case and the partitioning member. Therefore, the welding between the case and the partitioning member can be confirmed. Also, the welding between the case and the cover can be confirmed in the same way as the conventional airtightness test.

Also, according to the present invention, a pocket used as a space for storing weld burrs, which is provided between the second welding portion and the third welding portion, can be made small.

The automatic transmission oil filter is generally immersed in oil in an oil pan. For such an automatic transmission oil filter, it is important that the case and the filter element be welded surely. According to the present invention, the welding between the filter element and the case can be confirmed.

Further, according to the present invention, even if weld burrs are produced when the three members are welded, the weld burrs are filtered by the filter element, and hence are prevented from intruding into the automatic transmission.

DESCRIPTION OF SYMBOLS

Figure 1:
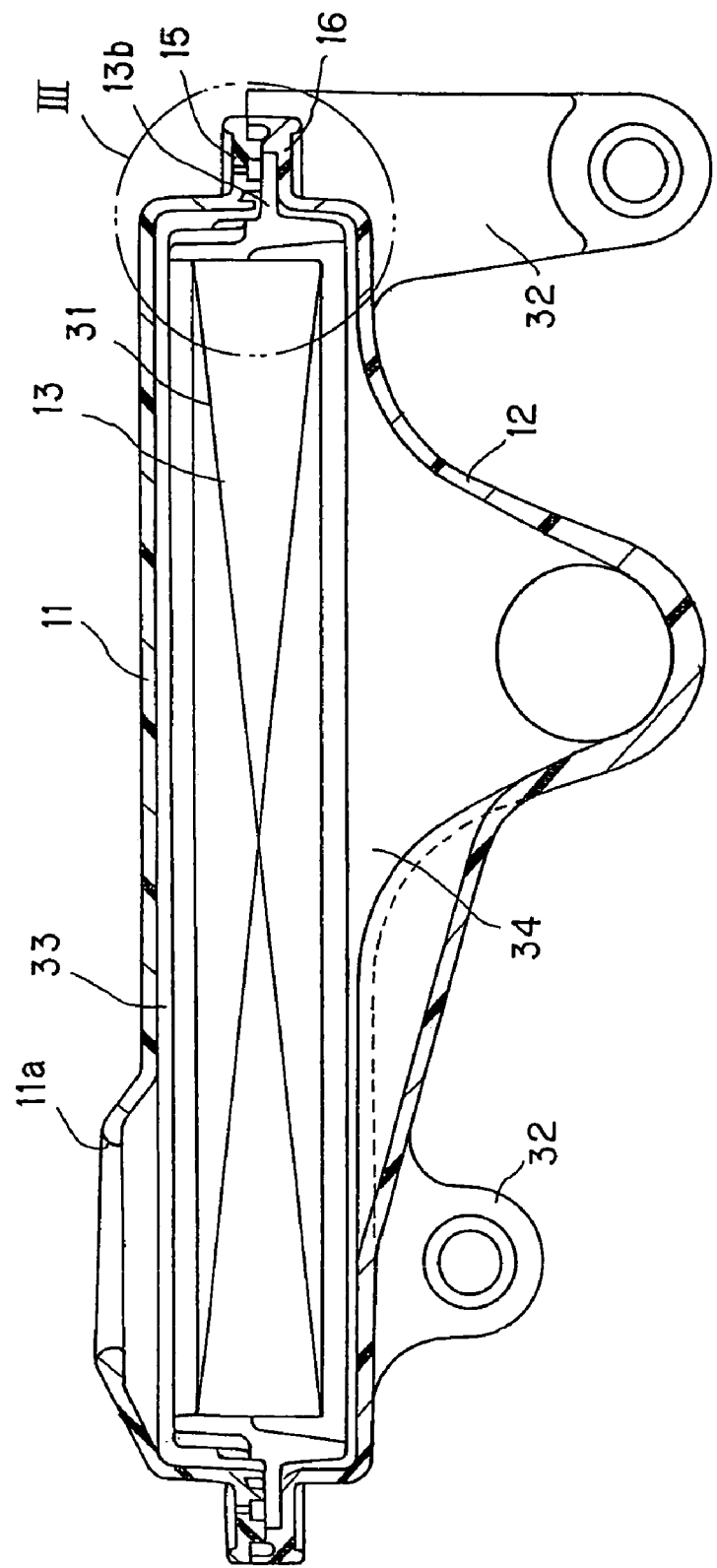
FIG. 1 is a sectional view of an oil filter in accordance with one embodiment of the present invention.

11 . . . case
12 . . . cover
13 . . . filter element
19a . . . welding allowance of first welding portion
19b . . . welding allowance of second welding portion
21 . . . first welding portion 22 . . . second welding portion
23 . . . third welding portion
24 . . . hole
33 . . . dust side
34 . . . clean side

BEST MODE FOR CARRYING OUT THE INVENTION

Figure 2:
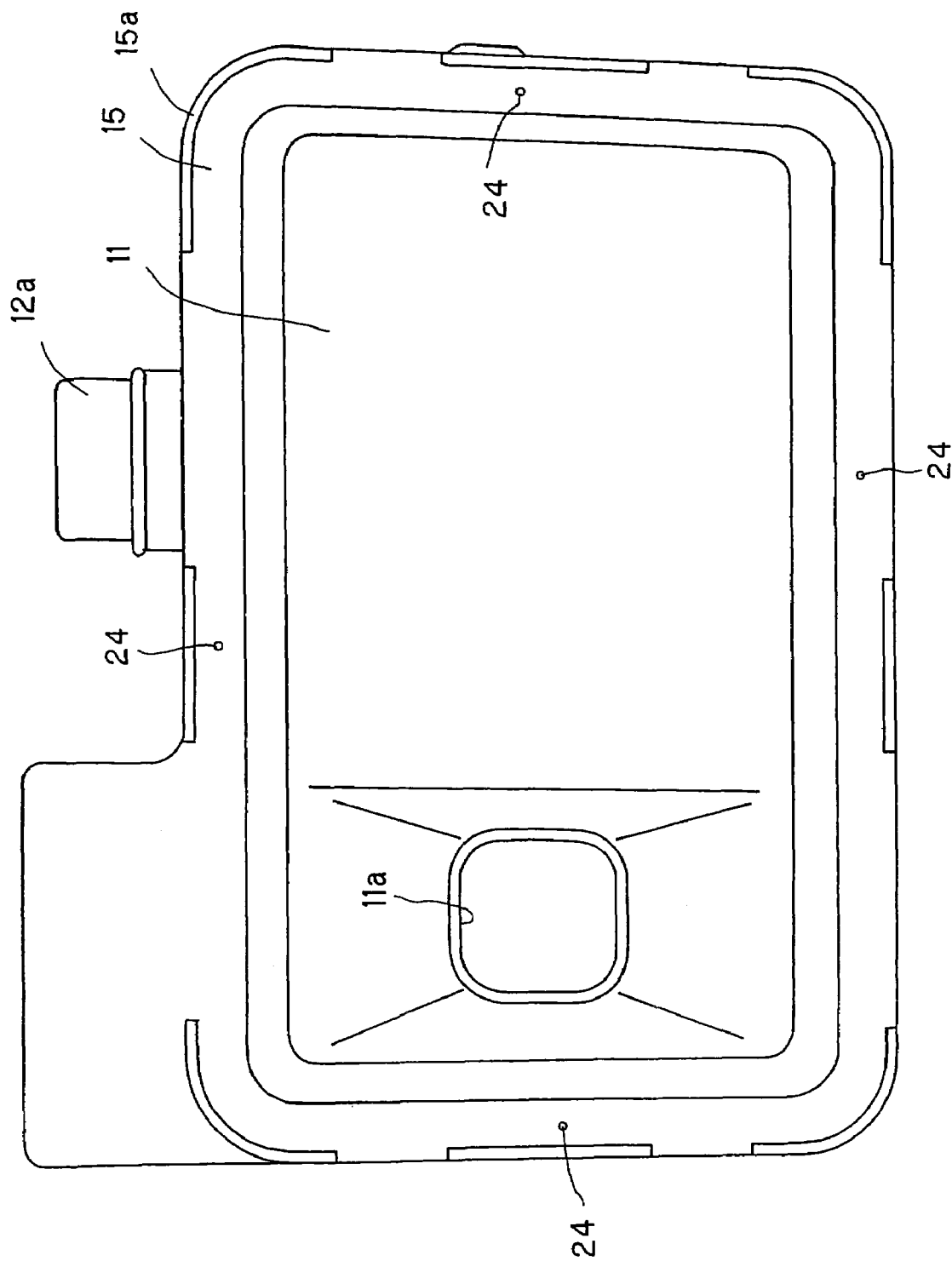
FIG. 2 is a plan view of the oil filter shown in FIG. 1.
Figure 3:
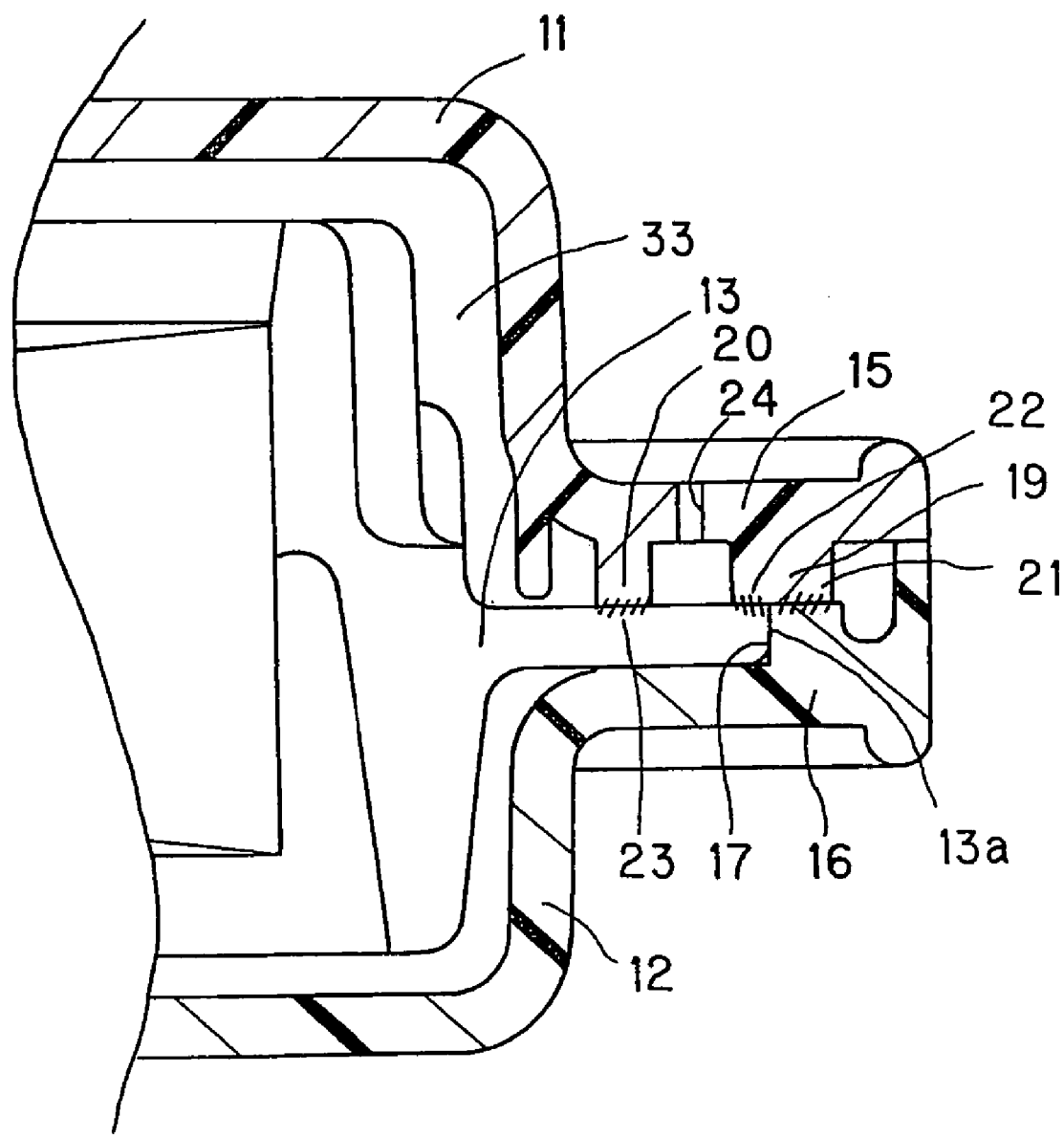
FIG. 3 is a detailed view of portion III in FIG. 1.

FIGS. 1 to 3 show an automatic transmission oil filter (hereinafter referred simply to as an oil filter) as a tank with a partitioning member in accordance with one embodiment of the present invention. This oil filter includes a resin-made case 11, a resin-made cover 12 for covering the case 11, and a filter element 13 used as a partitioning member held between the case 11 and the cover 12. The oil filter is immersed in oil in an oil pan in a state of being overturned from the state shown in FIG. 1.

The case 11 is provided with an inflow port 11a for oil, and the cover 12 is formed with an outflow port 12a connected to an oil pump, not shown. The oil in the oil pan is sucked through the inflow port 11a by the oil pump connected to the outflow port 12a, passing through the filter element 13, and flows out through the outflow port 12a. Dirty oil in the oil pan is filtered by the filter element 13. The filtered oil is sent from the oil pump to the automatic transmission.

The case 11 has a basin shape the lower surface of which is open, and is formed with a flange 15, which is welded to the filter element 13 and the cover 12, at the peripheral edge thereof. The cover 12 has a bowl shape the lower surface of which is open, and is formed with a flange 16, which is welded to the case 11, at the peripheral edge thereof. Also, the cover 12 is formed with mounting portions 32, 32 for fixing the oil filter to a transmission case etc.

The filter element 13 divides the interior of the oil filter into a dust side 33 on the upstream side of oil flow and a clean side 34 on the downstream side thereof. The filter element 13 has a filter medium 31 formed by pleating a fabric sheet consisting of filter paper, nonwoven fabric, or the like so that peaks and valleys are arranged alternately, and a resin-made frame 13b provided so as to surround the outer periphery of the filter medium 31.

FIG. 3 shows a three member welded structure in which three members of the case 11, the cover 12, and the filter element 13 are welded. In an upper surface inner periphery portion of the flange 16 of the cover 12 is formed a loop-shaped height difference portion 17 so that a peripheral edge portion 13a of the filter element 13 is fitted at the inner periphery of the height difference portion 17. In a lower surface outer periphery portion of the flange 15 of the case 11 is formed a loop-shaped first protruding portion 19, and in a lower surface inner periphery portion on the inside of the first protruding portion 19 is formed a loop-shaped second protruding portion 20.

The first protruding portion 19 of the case 11 and the cover 12 are welded to each other by a loop-shaped first welding portion 21. Also, the first protruding portion 19 of the case 11 and the filter element 13 are welded to each other by a loop-shaped second welding portion 22. The second welding portion 22 is arranged on the inside of the first welding portion 21. In this embodiment, the first protruding portion 19 of the case 11 is welded across the boundary between the height difference portion 17 of the cover 12 and the peripheral edge portion 13a of the filter element 13, so that the first welding portion 21 and the second welding portion 22 are continuous with each other. The first welding portion 21 and the second welding portion 22 need not necessarily be continuous with each other, and may be separated from each other.

On the inside of the second welding portion 22, a third welding portion 23 in which the case 11 and the filter element 13 are welded to each other is provided with a predetermined gap being provided between the second welding portion 22 and the third welding portion 23. The second welding portion 22 and the third welding portion 23 are provided on the side of the dust side 33 of filter element to prevent weld burrs from intruding into the clean side 34 and hence into the automatic transmission. The case 11 between the second welding portion 22 and the third welding portion 23 is formed with a hole 24 that is open to the atmosphere. This hole has a circular shape in cross section, and is provided at each of four sides of the case 11 (refer to FIG. 2) The shape and the number of the holes 24 can be changed appropriately.

Figure 4:
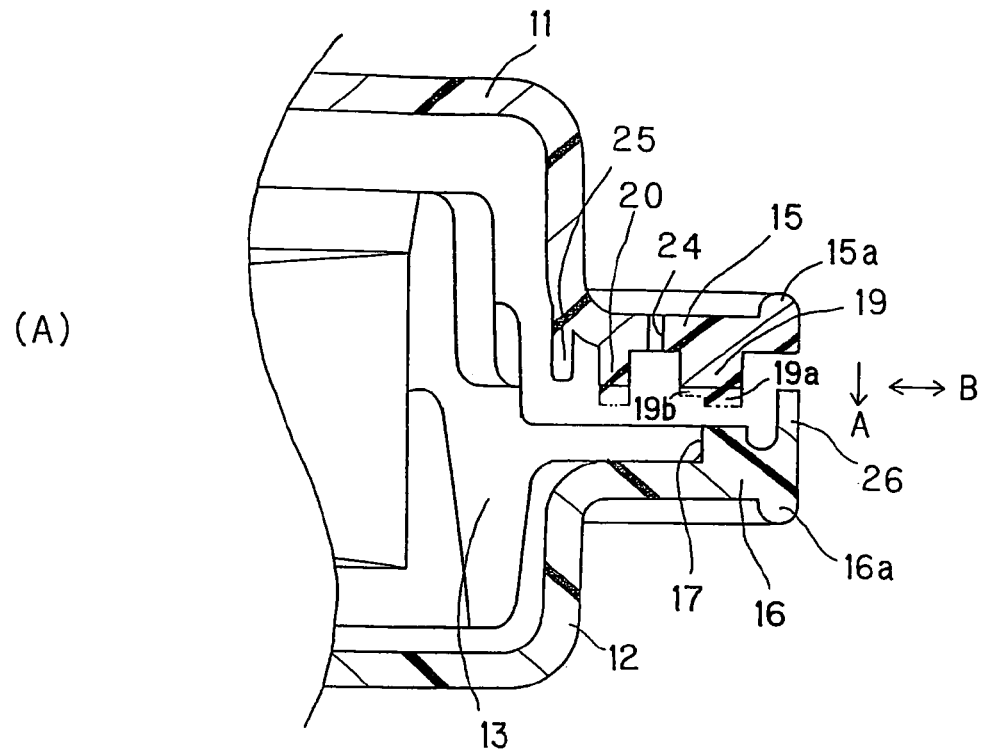
FIG. 4(A) is a sectional view of the oil filter before welding.
FIG. 4(B) is a sectional view of the oil filter after welding.
Figure 4:
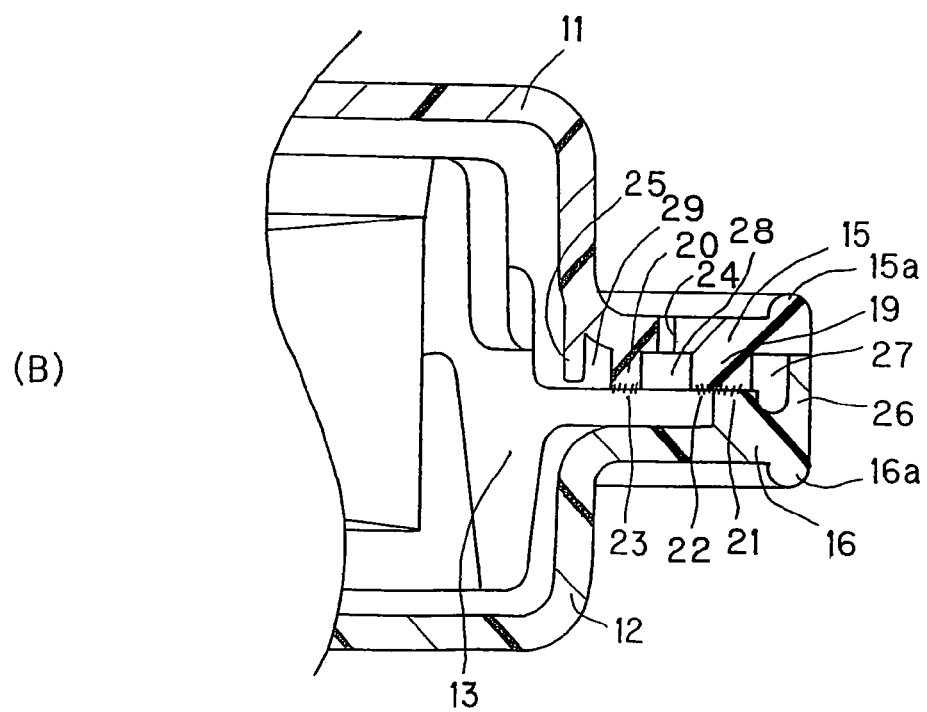

FIG. 4(A) shows the filter element before welding, and FIG. 4(B) shows the filter element after welding. The first protruding portion 19 is formed in the lower surface outer periphery portion of the flange 15 of the case 11, the second protruding portion 20 is formed in the inner periphery portion with a predetermined gap being provided between the first protruding portion 19 and the second protruding portion 20, and a loop-shaped bur inhibiting rib 25 is formed on the inside of the second protruding portion 20. A loop-shaped burr inhibiting rib 26 is also formed on the outside of the height difference portion 17 of the cover 12. Between the burr inhibiting rib 26 of the cover 12 and the first protruding portion 19 of the case 11, between the first protruding portion 19 of the case 11 and the second protruding portion 20 thereof, and between the second protruding portion 20 of the case 11 and the burr inhibiting rib 25 thereof, pocket portions 27, 28 and 29 are formed, respectively. These pocket portions 27, 28 and 29 serve as burr reservoirs.

In the first protruding portion 19 before welding, a welding allowance 19a (welding allowance with respect to the cover 12) in the first welding portion 21 and a welding allowance 19b (welding allowance with respect to the filter element) in the second welding portion 22 are formed. The height of the first welding allowance 19a is larger than that of the second welding allowance 19b. This is because the pocket portion 28 between the first protruding portion 19 and the second protruding portion 20 is made as small as possible. Depending on the size of the pocket portion 28, the height of the first welding portion 21 and the height of the second welding portion 22 may be the same.

The three member welding method consists of the following steps. First, the filter element 13 is fitted to the height difference portion 17 of the flange 16 of the cover 12. Thereby, the upper surface of the height difference portion 17 of the flange 16 of the cover 12 and the upper surface of the filter element 13 are made flush with each other. On the flush-mounted surfaces, the lower 20 surfaces of the first protruding portion 19 and the second protruding portion 20 of the case 11 are made to abut, being pressed in the direction indicated by the arrow A, and vibrations are applied in the direction indicated by the arrow B. Thereby, the first protruding portion 19 and the second protruding portion 20 of the case 11 and the welding surfaces of the cover 12 and the filter element 13, on which the protruding portions 19 and 20 abut, are meltedly connected by frictional heating. Ribs 15a, 16a engaging welding fixtures are provided on the peripheries of the flanges 15, 16 of the case 11 and the cover 12.

Figure 5:
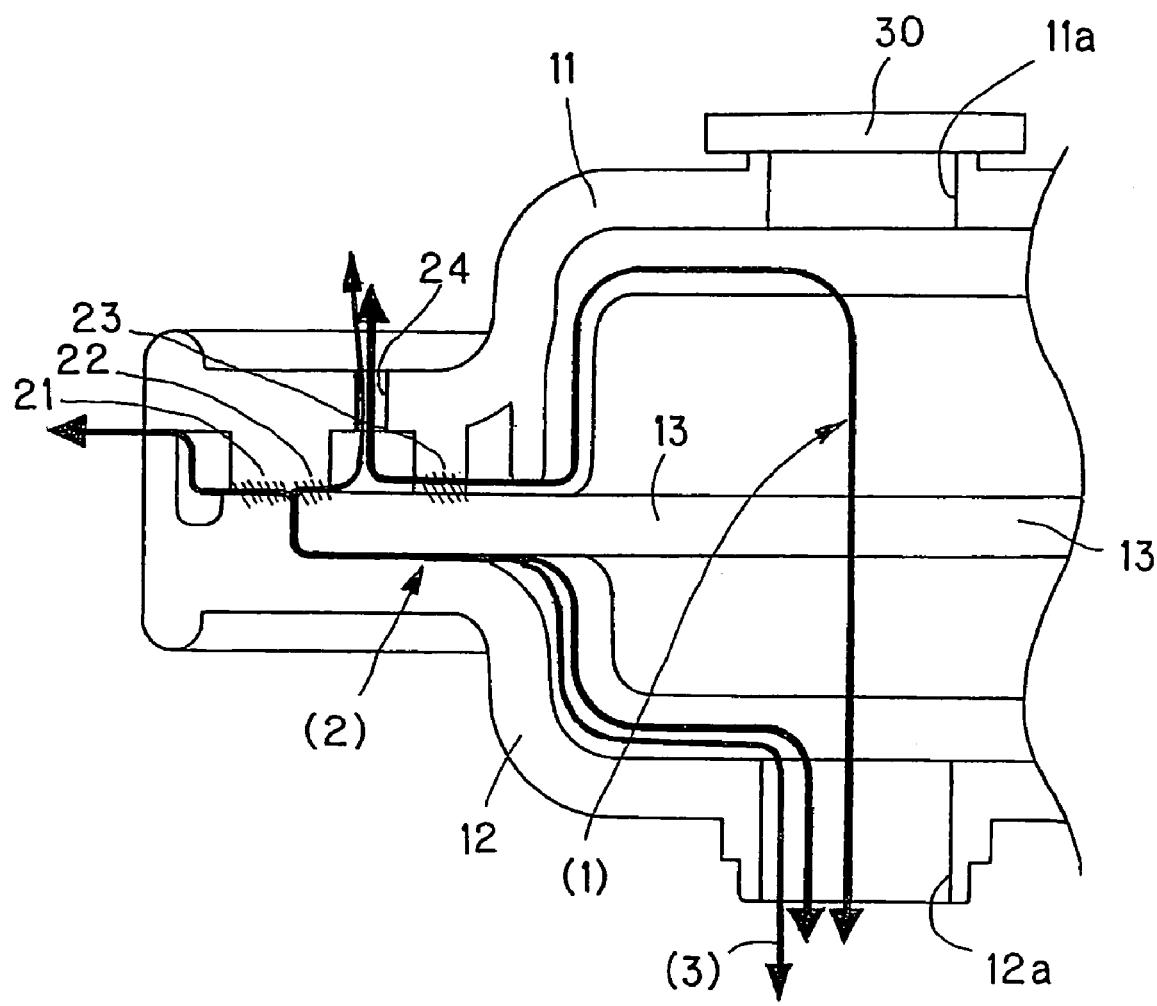
FIG. 5 is a sectional view of the oil filter being subjected to an airtightness test.
Figure 6:
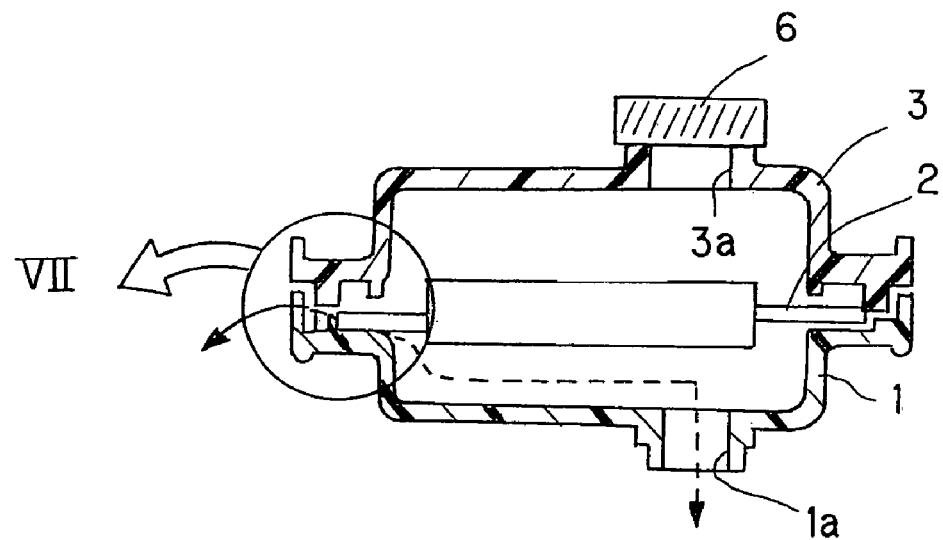
FIG. 6 is a sectional view of a conventional oil filter.
Figure 7:
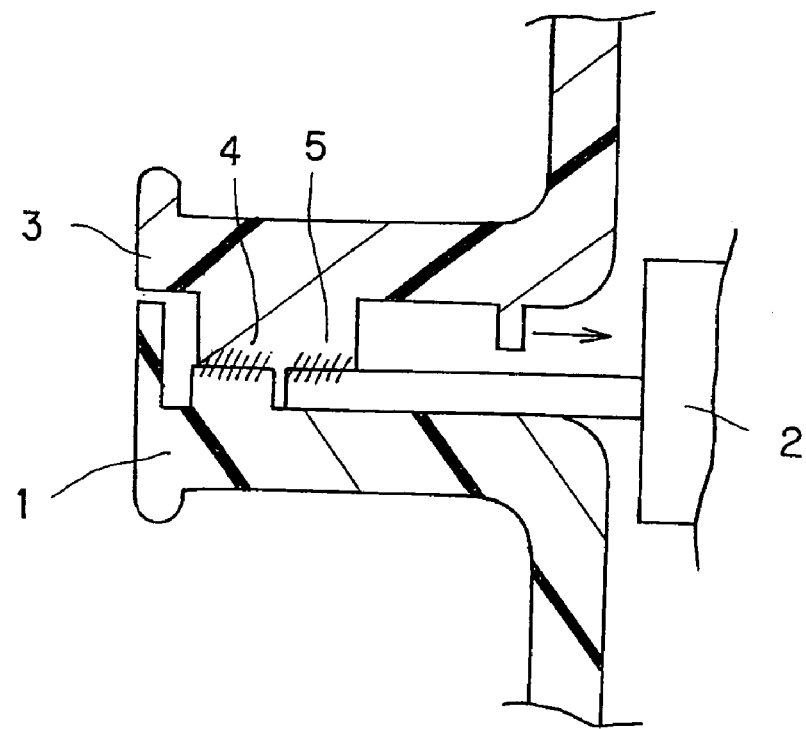
FIG. 7 is a detailed view of portion VII in FIG. 6.

FIG. 5 shows the oil filter being subjected to an airtightness test. The oil filter is subjected to an airtightness test after welding. The airtightness test is carried out as follows: the inflow port 11a of the case 11 is closed, for example, by a lid jig 30, and a negative pressure is produced at the outflow port 12a of the cover 12. In this state, a change of pressure in the filter is detected. Since the oil filter used in the oil pan is under a negative pressure, this airtightness test is suitable.

If the welding between the case 11 and the filter element 13 is insufficient, air leaks into the oil filter through the holes 24 open to the atmosphere, passing through the third welding portion 23 and the second welding portion 22 of the case 11 and the filter element 13 (paths of (1) and (3) in FIG. 5). Therefore, the welding between the case 11 and the filter element 13 can be confirmed. Also, if the welding between the case 11 and the cover 12 is insufficient, air leaks from the outside of the oil filter into the oil filter passing through the welding portion 21 between the case 11 and the cover 12 (a path of (2) in FIG. 5), so that the welding between the case 11 and the cover 12 can be confirmed.

The embodiment of the present invention is not limited to the above-described one, and can be changed variously in the scope in which the gist of the present invention is not changed. For example, the case with a partitioning member in accordance with the present invention is not limited the oil filter, and can be applied to a resonator integrated surge tank that reduces noise of an intake passage of an engine and an air filter for filtering air in an intake passage of an engine. Also, the three member welded structure is not limited to the above-described specific example if it has the first to third welding portions. Further, the airtightness test is also not limited to the above-described example. The test can be carried out, for example, under a positive pressure or in a liquid.

INDUSTRIAL APPLICABILITY

As application examples of the present invention, an automatic transmission filter for filtering an automatic transmission oil for a motor vehicle, a resonator integrated surge tank that reduces noise of an intake passage of an engine, an air filter for filtering air in an intake passage of an engine, and the like can be cited.

The invention claimed is:

1. A case with a partitioning member, comprising:
   a case;
   a cover for covering the case; and
   a partitioning member, having a peripheral portion, held between the case and the cover and partitioning an interior of the case and the cover, wherein,
   a first welding portion welds the case and the cover together at a position proximate to the peripheral portion of the partitioning member,
   a second welding portion welds the case and the peripheral portion of the partitioning member to each other, the second welding portion provided inside a first region formed by the first welding portion, the case, and the cover,
   a third welding portion welds the case and the peripheral portion of the partitioning member to each other, the third welding portion provided inside a second region formed by the second welding portion, the case, and the cover, the second region being inside the first region,
   the second welding portion and the third welding portion are spaced apart across a length of the peripheral portion to form a pocket portion above the length of the peripheral portion,
   a hole, open to the atmosphere, is provided in the case between the second welding portion and the third welding portion, the hole connecting with the pocket portion, and
   the pocket portion is separated from a fluid flow through the partitioning member.

2. The case with a partitioning member according to claim 1, wherein a welding allowance in the first welding portion of the case is higher than a welding allowance in the second welding portion of the case.

3. The case with a partitioning member according to claim 1, wherein,
   the case with a partitioning member is an automatic transmission oil filter, and
   the partitioning member is a filter element.

4. The case with a partitioning member according to claim 3, wherein the interior of the automatic transmission oil filter is partitioned, by the filter element, into a dust side on an upstream side of an oil flow, and a clean side on a downstream side of the oil flow, and
   the second welding portion and the third welding portion are provided in the dust side.

5. The case with a partitioning member according to claim 2, wherein,
   the case with a partitioning member is an automatic transmission oil filter, and
   the partitioning member is a filter element.

6. The case with a partitioning member according to claim 1, wherein the partitioning member partitions a length spanning the interior between the case and the cover.

7. The case with a partitioning member according to claim 1, wherein a surface, spanning the length of the peripheral portion and facing opposite the pocket portion, is in direct contact with a surface of the cover.

8. A case with a partitioning member, comprising:
   a case;
   a cover, a periphery of the cover connected with a periphery of the case to form an interior space between the case and the cover;
   a partitioning member, having a peripheral portion, positioned inside the interior space;
   a first welding portion connecting the case with the cover and positioned by the peripheral portion of the partitioning member;
   a second welding portion, positioned between the first welding portion and the interior space, connecting the case with the peripheral portion of the partitioning member; and
   a third welding portion, between the interior space and the second welding portion, connecting the case with the peripheral portion of the partitioning member, the third welding portion being spaced from the second welding portion to form an open pocket space between the second welding portion and the third welding portion above the peripheral portion of the partitioning member,
   wherein the case is provided with a hole, open to the atmosphere, between the second welding portion and the third welding portion and connected with the pocket portion, and
   wherein a surface, spanning the length of the peripheral portion and facing opposite the pocket portion, is in direct contact with a surface of the cover, and
   wherein the pocket portion is isolated from a fluid flow passing through the partitioning member.

9. The case with a partitioning member according to claim 8, wherein the partitioning member partitions an interior length spanning the interior space to form a first interior space and a second interior space.

* * * * *